(12) United States Patent
Goldberg et al.

(10) Patent No.: US 10,223,440 B2
(45) Date of Patent: Mar. 5, 2019

(54) QUESTION AND ANSWER SYSTEM EMULATING PEOPLE AND CLUSTERS OF BLENDED PEOPLE

(71) Applicant: International Business Machines Corporation, Armonk, NY (US)

(72) Inventors: Itzhack Goldberg, Hativat Givati (IL); James R. Kozloski, New Fairfield, CT (US); Clifford A. Pickover, Yorktown Heights, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 423 days.

(21) Appl. No.: 14/753,175

(22) Filed: Jun. 29, 2015

(65) Prior Publication Data
US 2016/0378852 A1    Dec. 29, 2016

(51) Int. Cl.
*G06F 17/30* (2006.01)

(52) U.S. Cl.
CPC .............................. *G06F 17/30654* (2013.01)

(58) Field of Classification Search
CPC ................................................. G06F 17/30653
See application file for complete search history.

(56) References Cited

U.S. PATENT DOCUMENTS

| 796,631 | A | 8/1905 | Fischer |
| 7,089,218 | B1 | 8/2006 | Visel |
| 7,966,316 | B2 | 6/2011 | Cao et al. |
| 8,280,885 | B2 | 10/2012 | Cardie et al. |
| 8,560,567 | B2 | 10/2013 | Azzam et al. |
| 8,589,807 | B2 | 11/2013 | Baldwin et al. |
| 8,805,756 | B2 | 8/2014 | Boss et al. |
| 9,020,810 | B2 | 4/2015 | Gliozzo |
| 9,336,268 | B1* | 5/2016 | Moudy ............. G06F 17/30412 |
| 2009/0162824 | A1* | 6/2009 | Heck ....................... G06Q 10/10 434/322 |
| 2012/0078889 | A1* | 3/2012 | Chu-Carroll ...... G06F 17/30654 707/723 |

(Continued)

OTHER PUBLICATIONS

Zhang et al., "Towards Personalized Medicine: Leveraging Patient Similarity and Drug Similarity Analytics." Apr. 7, 2014. (5 pgs).

(Continued)

*Primary Examiner* — Syling Yen
*Assistant Examiner* — Tony Wu
(74) *Attorney, Agent, or Firm* — Cantor Colburn LLP; Rahan Uddin

(57) ABSTRACT

Embodiments are directed to an information processing system for generating answers in response to questions. The system includes a memory, a processor system communicatively coupled to the memory. The processor system is configured to store in the memory data of a corpus of a predetermined entity, and receive a question comprising a natural language format. The processor circuit is further configured to analyze the data of the corpus of the predetermined entity to derive an emulated answer to the question, wherein the emulated answer includes an emulation of an actual answer that would be provided by the predetermined entity.

20 Claims, 7 Drawing Sheets

(56) References Cited

U.S. PATENT DOCUMENTS

2015/0006158 A1    1/2015  Allen et al.
2015/0026106 A1*   1/2015  Oh ..................... G06F 17/3069
                                                            706/12

OTHER PUBLICATIONS

F. Pedregosa et al., "1.11. Ensemble methods—scikit-learn 0.18.2 documentation," scikit-learn, http://scikit-learn.org/stable/modules/ensemble.html (retrieved Jul. 11, 2017), 3 pages.

J. Blackman, "The Next Evolution of SCOTUS Predictions: Predicting 7,000 Cases Over 60 Years with 71% Accuracy," Josh Blackman's Blog, http://joshblackman.com/blog/2014/07/29/the-next-evolution-of-scotus-predictions-predicting-7000-cases-over-60-years-with-71-accuracy/ (retrieved Jul. 11, 2017), Jul. 2014, 5 pages.

McNulty, "This Model Can Predict 7 out 10 Supreme Court Rulings," Dataconomy, http://dataconomy.com/2014/08/model-can-predict-7-10-supreme-court-rulings/ (retrieved Jul. 11, 2017), Aug. 2014, 3 pages.

\* cited by examiner

QUESTION AND ANSWER SYSTEM EMULATING PEOPLE AND CLUSTERS OF BLENDED PEOPLE

BACKGROUND

The present disclosure relates in general to natural language processing question & answer (NLP Q&A) systems. More specifically, the present disclosure relates to NLP Q&A systems tailored to emulate answers that would be provided by a predetermined entity or by a predetermined cluster of blended entities.

It is known to provide NLP Q&A systems that answer natural language questions by querying data repositories and applying elements of language processing, information retrieval and machine learning to arrive at a conclusion. Such systems are able to assist humans with certain types of semantic query and search operations, such as the type of natural question-and-answer paradigm of a medical environment. An example NLP Q&A system is IBM's DeepQA technology described in U.S. Pat. No. 8,275,803, issued Sep. 25, 2012, which is assigned to the assignee of the present disclosure, and which is incorporated by reference herein in its entirety.

DeepQA systems and methodologies have been developed that are able to understand complex questions input to the system in natural language, and are able to answer the questions with enough precision, confidence, and speed to augment human handling of the same questions within a given environment, such as a medical inquiry and diagnostic paradigm where time-to-answer is of the essence. NLP Q&A systems such as IBM's DeepQA technology often used unstructured information management architecture (UIMA), which is a component software architecture for the development, discovery, composition, and deployment of multimodal analytics for the analysis of unstructured information and its integration with search technologies developed by IBM.

Because NLP Q&A systems obtain "knowledge" by accessing and processing information, it is generally accepted that feeding more information into such systems has the potential to increase the scope of the system's knowledge and improve the quality of the conclusions/answers the system provides. However, there are practical limitations on the ability to feed more information to a system. For example, some information for a variety of reasons may simply be inaccessible. Even if accessible, accessing the information often comes at a cost, which may be a direct financial cost (e.g., fees for access to a database) or the time-cost and/or computing resource cost of ingesting and analyzing more information.

SUMMARY

Embodiments are directed to an information processing system for generating answers in response to questions. The system includes a memory, a processor system communicatively coupled to the memory. The processor system is configured to store in the memory data of a corpus of a predetermined entity, and receive a question comprising a natural language format. The processor circuit is further configured to analyze the data of the corpus of the predetermined entity to derive an emulated answer to the question, wherein the emulated answer includes an emulation of an actual answer that would be provided by the predetermined entity.

Embodiments are further directed to an information processing system for generating answers in response to questions. The system includes a memory, a processor system communicatively coupled to the memory. The processor system is configured to perform a method including storing in the memory data of a corpus of a predetermined entity, and receiving a question comprising a natural language format. The method performed by the processor system further comprises analyzing the data of the corpus of the predetermined entity to derive an emulated answer to the question, wherein the emulated answer includes an emulation of an actual answer that would be provided by the predetermined entity.

Embodiments are further directed to a computer program product for implementing an information processing system that generates answers to questions. The computer program product includes a computer readable storage medium having program instructions embodied therewith, wherein the computer readable storage medium is not a transitory signal per se. The program instructions are readable by a processor circuit to cause the processor circuit to perform a method that includes storing in a memory data of a corpus of a predetermined entity, and receiving a question comprising a natural language format. The method further comprises analyzing the data of the corpus of the predetermined entity to derive an emulated answer to the question, wherein the emulated answer includes an emulation of an actual answer that would be provided by the predetermined entity.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
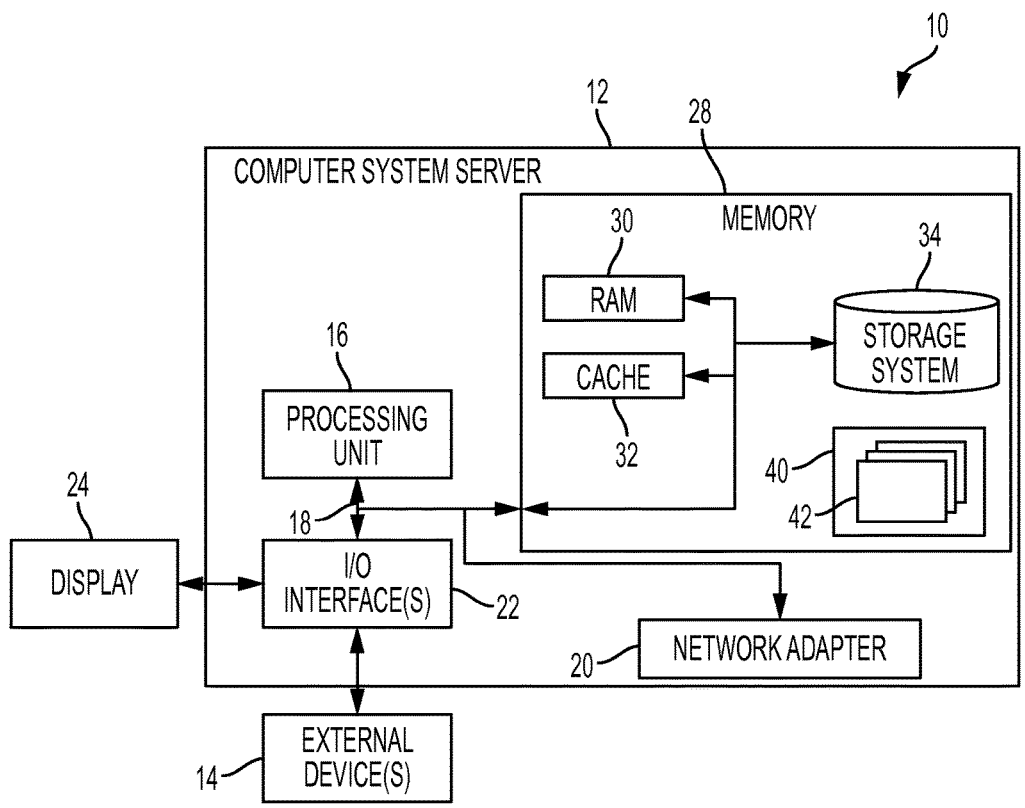
FIG. 1 depicts a cloud computing node according to one or more embodiments.

In the accompanying figures and following detailed description of the disclosed embodiments, the various elements illustrated in the figures are provided with three digit reference numbers. The leftmost digits of each reference number corresponds to the figure in which its element is first illustrated.

DETAILED DESCRIPTION

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Additionally, although embodiments of the present disclosure are provided in connection with IBM's DeepQA natural language processing technology, the teachings of the present disclosure may be implemented in connection with any type of natural language processing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
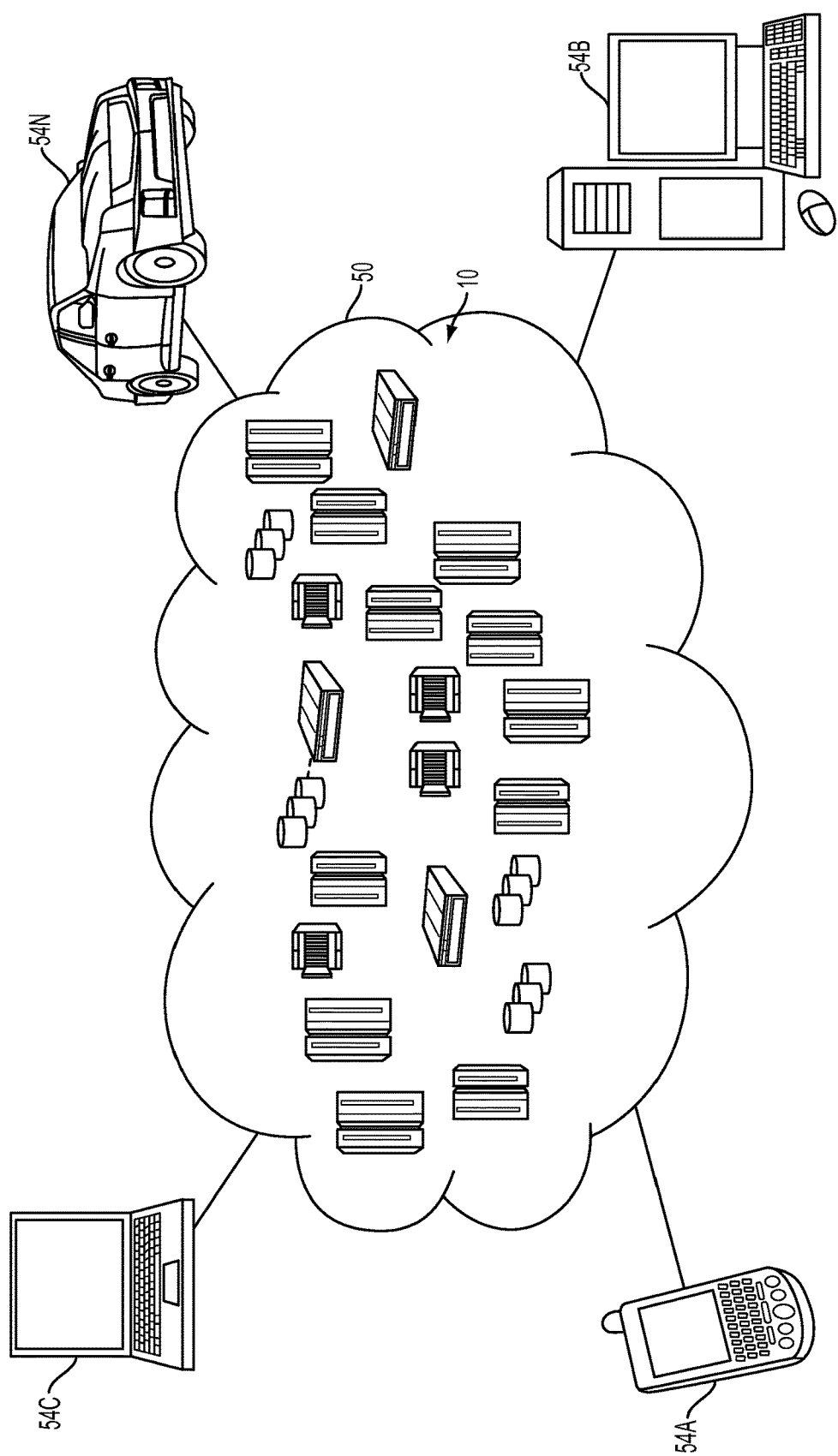
FIG. 2 depicts a cloud computing environment according to one or more embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
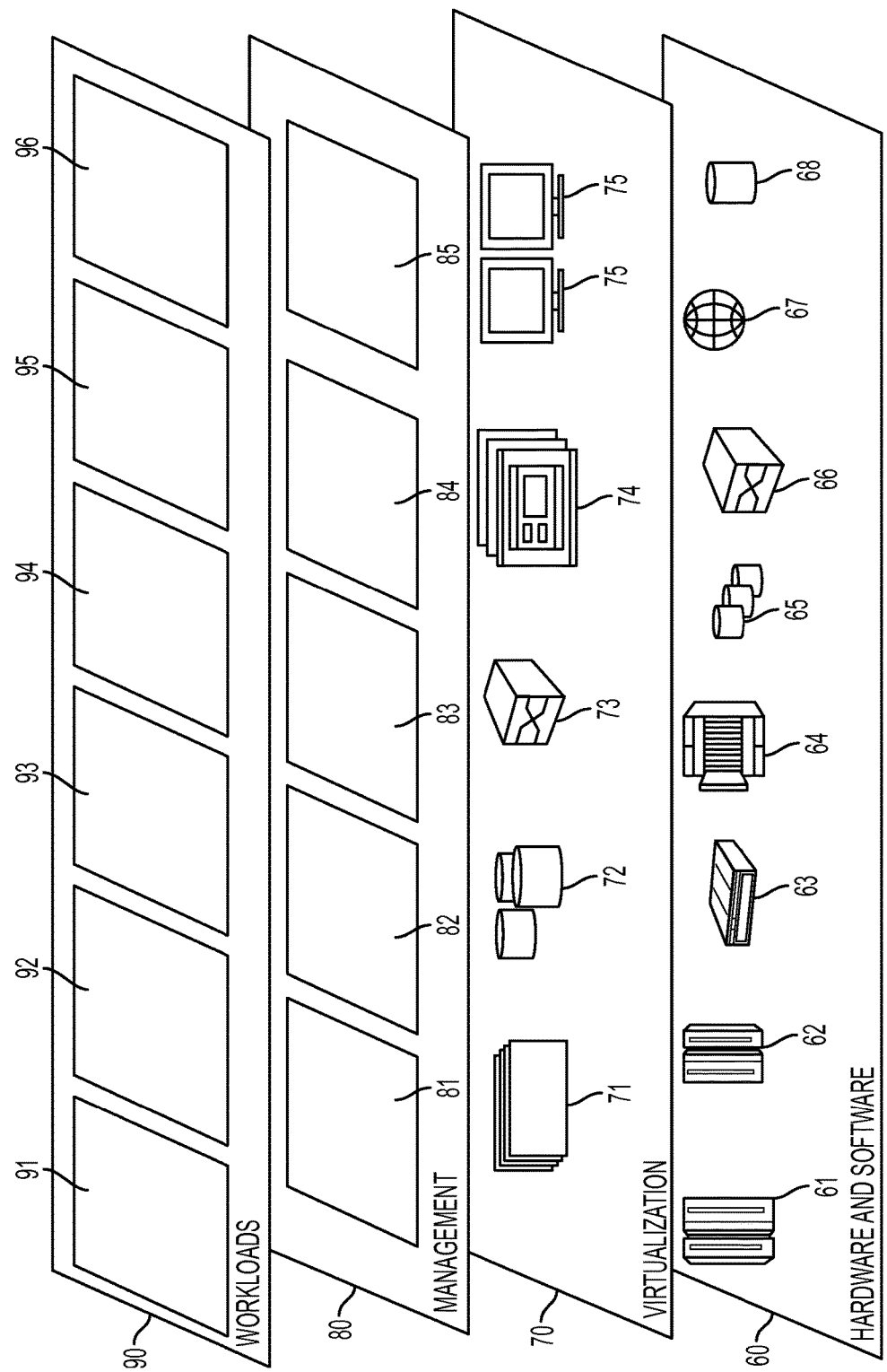
FIG. 3 depicts abstraction model layers according to one or more embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a NLP Q&A module 96 that emulates answers that would be provided by a predetermined responding entity or by a predetermined responding cluster of blended entities.

As previously noted herein, it is known to provide NLP Q&A systems that answer natural language questions by querying data repositories and applying elements of language processing, information retrieval and machine learning to arrive at a conclusion. Such systems are able to assist humans with certain types of semantic query and search operations, such as the type of natural question-and-answer paradigm of a medical environment. An example NLP Q&A system is IBM's DeepQA technology as described in U.S. Pat. No. 8,275,803, issued Sep. 25, 2012, which is assigned to the assignee of the present disclosure, and which is incorporated by reference herein in its entirety. DeepQA systems and methodologies have been developed that are able to understand complex questions input to the system in natural language, and are able to answer the questions with enough precision, confidence, and speed to augment human handling of the same questions within a given environment, such as a medical inquiry and diagnostic paradigm where time-to-answer is of the essence. NLP Q&A systems such as IBM's DeepQA technology often used unstructured information management architecture (UIMA), which is a component software architecture for the development, discovery, composition, and deployment of multi-modal analytics for the analysis of unstructured information and its integration with search technologies developed by IBM.

Because NLP Q&A systems obtain "knowledge" by accessing and processing information, it is generally accepted that feeding more information into such systems has the potential to increase the scope of the system's knowledge and improve the quality of the answers the system provides. However, there are practical limitations on the ability to feed more information to a system. For example, some information for a variety of reasons may simply be inaccessible. Even if accessible, accessing the information often comes at a cost, which may be a direct financial cost (e.g., fees for access to a database) or the time-cost and/or computing resource cost of ingesting and analyzing more information.

Turning now to an overview of the present disclosure, one or more embodiments provide "emulation" NLP Q&A (hereinafter, "emulation Q&A") systems and methodologies that do not attempt to increase the overall volume of information that is accessed and processed by the system. Instead, the disclosed emulation Q&A systems and methodologies focus and refine the overall volume of information that is accessed and processed by the system in order to emulate the answers that the system determines, through analysis, would be provided by a predetermined responding entity or by a predetermined responding cluster of blended entity. The term "emulation" as used herein refers to emulating the substance of answers that would be provided by a predetermined responding entity or cluster of blended entities, and may also refer to emulating the style (e.g., voice, actual or computer aided design (CAD) images, cadence, phraseology, quotes, etc.) of the responding entity, cluster of blended entities and various combinations of the preceding. The term "entity" as used herein refers to individuals and groups of individuals that may take a variety of forms, including an actual person (living or deceased), an existing or former group of actual people (living or deceased), an existing or former organization, a fictional person, a fictional group of people, a fictional organization and an artificial agent having natural language processing capabilities.

The disclosed emulation Q&A system makes use of machine learning, which includes inferential transfer learning, to emulate one or more predetermined responding entities by returning answers to a querent "as if" the answer was generated by the one or more predetermined responding entities. The responses from the disclosed emulation Q&A system are tailored to in effect answer the broad question of "what would 'X' say?" by representing networks of data/information as matrices and mapping the data/information matrices to one another. The mapping used in accordance with the present disclosure utilizes three matrices, which are, broadly, one matrix of broader information/data, one matrix of more narrow information/data and one matrix for the relationship between the two networks. More specifically, the mapping used in accordance with the present disclosure includes a network and corresponding matrix to represent topic similarity of questions asked to the emulation Q&A system over some time period, a network and corresponding matrix to represent topic similarity of answers provided over the same time period, and a mapping matrix that represents the specific answers to specific questions provided by the emulation Q&A system.

In order to effect an emulation, the disclosed emulation system may ingest content related to the one or more predetermined responding entities, such as books, interviews, news items, speeches, articles, television, emails (if permitted), meeting audio/notes, books that the one or more predetermined responding entities is reading or has read, etcetera. The disclosed Q&A system may include sentiment analysis, which may include, for example, ingesting multimedia to extract extra nuance such as emotions, voice stress, movement of body, gait, gestures, facial gestures, etcetera. Optionally, data of what others say about the predetermined responding entity may be ingested, including television news and opinion content. Optionally, data of the cognitive style and personalities of the one or more predetermined responding entities may also be ingested. As previously noted, accessing information often comes at a cost, which may be a direct financial cost (e.g., fees for access to a database) or the time-cost and/or computing resource cost of ingesting and analyzing more information. The disclosed emulation system includes functionality that can estimate the value of accessing a particular database with respect to the cost of access, which allows the disclosed system to answer a query with a particular "bias" (e.g., the bias of a particular expert or team of experts) in a certain amount of time (e.g., a delay of 10 seconds).

In accordance with one or more disclosed embodiments of the present disclosure, the disclosed emulation Q&A system incorporates a mapping of additional questions, referred to herein as "historical" questions that have been posed to a specific predetermined responding entity through the disclosed emulation Q&A system over some time period. The historical questions network is different than the Q&A question topics that were presented to the emulation Q&A system during system configuration/development, although aspects of the topics and networks may overlap. The historical questions network will reflect a number of features that may be used to condition the responses provided by the emulation Q&A system. For example, the historical questions network may reflect a concentration of questions in some regions (e.g., finance), and reflect a sparseness of questions in other regions (e.g., urban lifestyles). The new set of questions represented by the historical questions network may be represented in a historical questions matrix, and a distortion matrix may be derived representing a transformation from the Q&A question topics to that of the specific predetermined responding entity's question topics. This distortion matrix may then be used to modify a confidence level that the emulation Q&A system applies when determining an answer to a question. More specifically, when the distortion matrix is dense (indicating entity "X" is more of an expert than the emulation Q&A system) the required threshold for confidence is high for the emulation Q&A system as it approaches an answer in this region. When the distortion matrix is sparse (indicating entity "X" is less of an expert than the disclosed emulation Q&A system) the required threshold for confidence is low for the emulation Q&A system as it approaches an answer in this region (and therefore it will often be wrong). Additionally, the distortion matrix can be incorporated as an additional consideration taken into account by the previously described functionality that estimates the value of accessing a particular database with respect to the cost of access, which allows the disclosed system to answer a query with a particular "bias" (e.g., the bias of a particular expert or team of experts) in a certain amount of time (e.g., a delay of 10 seconds). For example, if the information to be accessed corresponds to a dense region of the distortion matrix, the value of accessing the information may be increased. If the information to be accessed corresponds to a sparse region of the distortion matrix, the value of accessing the information may be decreased. A similar configuration may be provided for historical answers and associated distortion matrices that have been generated by the disclosed emulation system.

As previously noted, the term "entity" is used herein to refer to individuals and groups of individuals that may take a variety of forms, including an actual person (living or deceased), an existing or former group of actual people (living or deceased), an existing or former organization, a fictional person, a fictional group of people, a fictional organization and an artificial agent having natural language processing capabilities. Accordingly, in one or more embodiments, the predetermined "responding entity" may be a composite of responding persons, such as a group, team, board, committee, governmental agency, etcetera. Each individual person P(i) of the composite (X) may be weighted (x1) according to the equation $X=x1*P(1)+x1*P(2)+ \ldots x1*P(N)$. The composite responding person may include members of a social network, and network distance may serve as one means of weighting. A software "dial" may be used to change the weighting of the composite responding person. Similarly, the disclosed emulation system may select an increasing radius of emulated people in the social network by fanning out to include more members if desired. For example, the members of the social network may include the chief surgeon of a hospital then "fan out" to other doctors, nurses, etcetera. Similarly, the predetermined composite responding person may include members of an organizational chart, and the level in the chart encompassed by the predetermined responding person may be controlled.

At least the features and combinations of features described in the immediately preceding paragraphs, including the corresponding features and combinations of features depicted in the figures, amount to significantly more than implementing a method of emulating the responses of a predetermined entity using a particular technological environment. Additionally, at least the features and combinations of features described in the immediately preceding paragraphs, including the corresponding features and combinations of features depicted in the figures, go beyond what is well-understood, routine and conventional in the relevant field(s).

Figure 4:
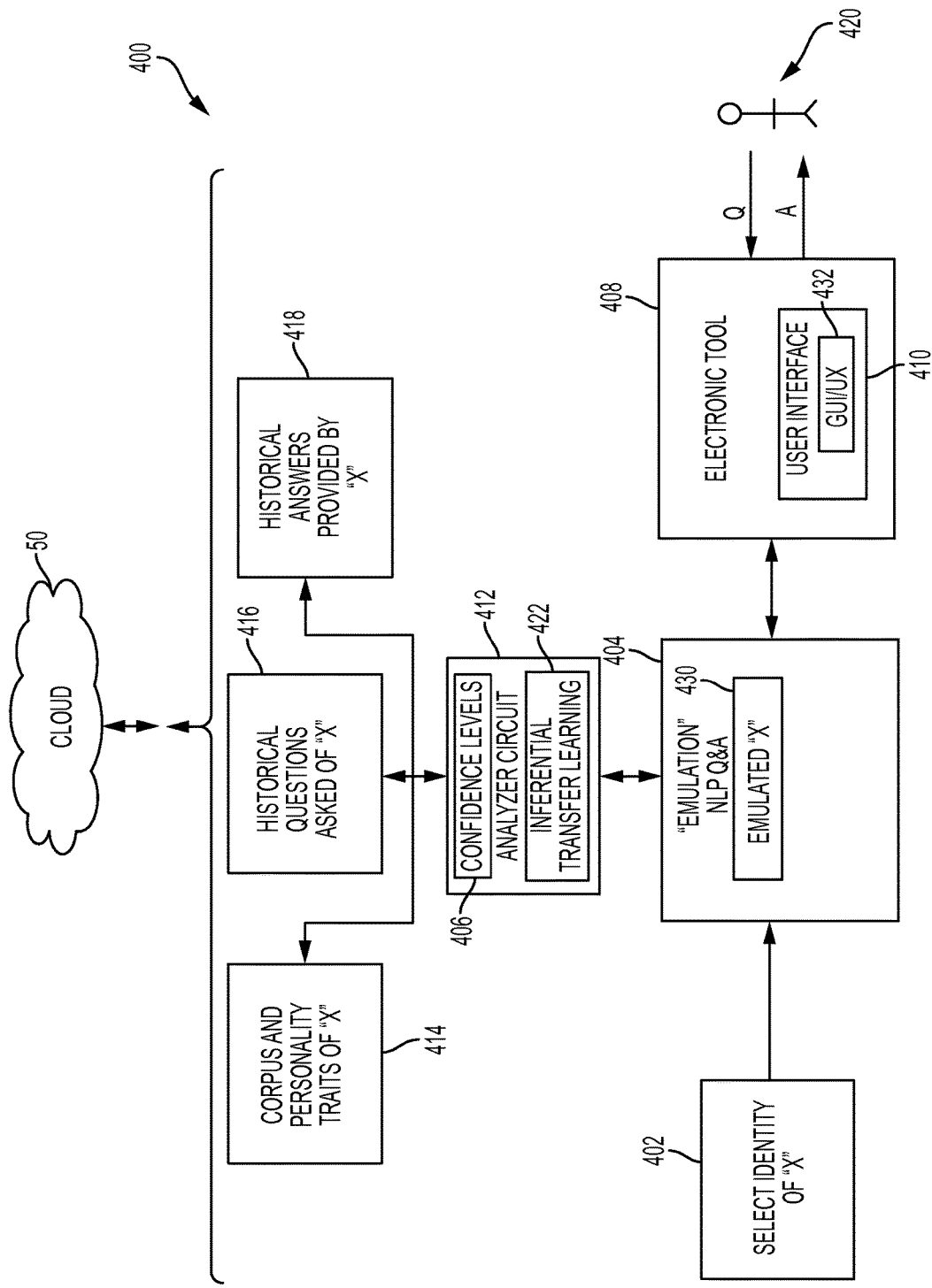
FIG. 4 depicts a diagram illustrating a system according to one or more embodiments.

Turning now to a more detailed description of the present disclosure, FIG. 4 depicts a diagram illustrating an emulation NLP Q&A system 400 that emulates answers that would be provided by a predetermined entity or by a predetermined cluster of blended entities according to one or more embodiments. The individual circuitry components of system 400 are illustrated separately for convenience. It is intended that the functionality of the various components of system 400 may be provided in a different arrangement of components and still fall within the scope of the teachings of the present disclosure. For example, the functionality of components 414, 416, 418 may be integrated and provided in component 412. In its broadest sense, system 400 is configured to emulate responses that system 400 determines, through analysis, would be provided by a specific entity "X" in response to questions presented to system 400 by a user/client 430. The details of the operation of system 400 are described in the following paragraphs.

System 400 includes a selection circuit 402, an emulation NLP Q&A circuit 404 having emulated X circuitry 430, an electronic tool 408 having a user interface 410 and a GUI/UX (graphical user interface/user experience) circuit 432, an analyzer circuit 412 having confidence levels circuitry 406 and inferential transfer learning circuitry 422, a corpus and personality traits of "X" circuit 414, a historical questions asked of "X" circuit 416, a historical answers provided by "X" circuit 418 and cloud computing system 50, configured and arranged as shown. A user or client 420 interfaces with system 400 via user interface 404 and GUI/UX circuit 432 of electronic tool 402. Cloud 50 may supplement, support or replace some or all of the functionality of selection circuit 402, emulation NLP Q&A circuit 404, emulated "X" circuitry 430, electronic tool 408, user interface 410, GUI/UX circuit 432, analyzer circuit 412, confidence levels circuitry 406, inferential transfer learning circuitry 422, corpus and personality traits of "X" circuit 414, historical questions asked of "X" circuit 416 and historical answers provided by "X" circuit 418. Additionally, some or all of the functionality of selection circuit 402, emulation NLP Q&A circuit 404, emulated "X" circuit 430, electronic tool 408, user interface 410, GUI/UX circuit 432, analyzer circuit 412, confidence levels circuitry 406, inferential transfer learning circuitry 422, corpus and personality traits of "X" circuit 414, historical questions asked of "X" circuit 416 and historical answers provided by "X" circuit 418 may be implemented as a node 10 (shown in FIGS. 1 and 2) of cloud 50.

Selection circuitry 402 allows the selection of the specific predetermined entity or cluster of blended entities (shown, collectively, as "X" in FIG. 4) for use by emulation Q&A system 400, which does not attempt to increase the overall volume of information that is accessed and processed by emulation system 400. Instead, emulation Q&A system 400 (e.g., analyzer circuit 412, confidence levels circuitry 406, inferential transfer learning circuit 422), focuses and refines the overall volume of information that is accessed and processed by emulation system 400 in order to emulate the answers that the system determines, through analysis, would be provided by predetermined responding entity or predetermined responding cluster of blended entities "X". Emulation NLP Q&A system 400 (e.g., analyzer circuit 412, confidence levels circuitry 406, inferential transfer learning circuit 422) of system 400, emulates the substance of answers that would be provided by a predetermined responding entity or cluster of blended entities "X," and may also emulate the style (e.g., voice, actual or computer aided design (CAD) images, cadence, phraseology, quotes, etc.) of the responding entity or cluster of blended entities "X." More specifically, emulation NLP Q&A system 400 via emulated "X" circuit 430 accumulates data of both the substance of answers provided by specific entity "X" in response to questions presented by user/client 420, as well as data of the style (e.g., voice, actual or computer aided design (CAD) images, cadence, phraseology, quotes, etc.) of specific entity "X."

Analyzer circuit 412 via inferential transfer learning circuit 422 uses machine learning to represent networks of data/information (e.g., corpus and personality traits of "X" circuit 414, historical questions asked of "X" circuit 416, historical answers provided by "X" circuit 418) as matrices and map the data/information matrices to one another. The mapping used in accordance with inferential transfer learning circuitry 422 utilizes three matrices, which are, broadly, one matrix of broader information/data, one matrix of more narrow information/data and one matrix for the relationship between the two networks. More specifically, the mapping used in accordance with inferential transfer learning circuitry 422 includes a network and corresponding matrix to represent topic similarity of questions asked to the emulation Q&A system over some time period, a network and corresponding matrix to represent topic similarity of answers provided over the same time period, and a mapping matrix that represents the specific answers to specific questions provided by the emulation Q&A system. Additional details of inferential transfer learning circuit 422 are subsequently herein and illustrated in FIG. 5.

Emulated answers produced by analyzer circuit 412, inferential transfer learning 422 and confidence levels circuit 406 are generated at confidence levels (CLs). When analyzer circuit 412 determines that the value of CL is below a predetermined threshold (TH) (i.e., CL<TH), an answer to the question may not be provided, or may be provided with appropriate qualifiers. If CL>TH, an answer to the question may be provided with greater emphasis or with more certainty. Many different predetermined TH levels may be provided with different response variations being triggered each predetermined TH level. The predetermined TH levels and associated response triggered may be influenced by historical questions asked of "X" circuit 416 and historical answers provided by "X" circuit 418 as described in more detail in subsequent paragraphs.

Additionally, emulated answers produced by analyzer circuit 412 may be weighted based on the nature of the entity "X." As previously noted, the term "entity" is used herein to refer to individuals and groups of individuals that may take a variety of forms, including an actual person (living or deceased), an existing or former group of actual people (living or deceased), an existing or former organization, a fictional person, a fictional group of people, a fictional organization and an artificial agent having natural language processing capabilities. Accordingly, in one or more embodiments, the predetermined "responding entity" may be a composite of responding persons, such as a group, team, board, committee, governmental agency, etcetera. Each individual person P(i) of the composite (X) may be weighted (x1) by analyzer circuit 412 according to the equation $X=x1*P(1)+x1*P(2)+ \ldots x1*P(N)$. The composite responding person may include members of a social network, and network distance may serve as one means of weighting. A software "dial" may be provided to designers of emulated system 400 (or to user/client 420) to change the weighting of the composite responding person. Similarly, analyzer circuit 412 may include functionality that selects an increasing radius of emulated people in the social network by fanning out to include more members if desired. For example, the members of the social network may include the chief surgeon of a hospital then "fan out" to other doctors, nurses, etcetera. Similarly, the predetermined composite responding person may include members of an organizational chart, and the level in the chart encompassed by the predetermined responding person may be controlled.

Corpus and personality traits of "X" circuitry 414 provides to analyzer circuit 412 and inferential transfer learning circuit 422 content related to the one or more predetermined responding entities "X," such as books, interviews, news items, speeches, articles, television, emails (if permitted), meeting audio/notes, books that the one or more predetermined responding entities is reading or has read, etcetera. Corpus and personality traits of "X" circuitry 414 also provides to analyzer circuit 412 and inferential transfer learning circuit 422 content that will be used to perform sentiment analysis of "X," which may include, for example, multimedia content for extra nuance, such as emotions, voice stress, movement of body, gait, gestures, facial gestures, etcetera. Optionally, corpus and personality traits of "X" circuitry 414 may also provide data of what others say about the predetermined responding entity, television news and opinion content, and data of the cognitive style and personalities of the one or more predetermined responding entities "X." As previously noted, accessing information often comes at a cost, which may be a direct financial cost (e.g., fees for access to a database) or the time-cost and/or computing resource cost of ingesting and analyzing more information. Corpus and personality traits of "X" circuit 414 includes functionality that can estimate the value of accessing a particular database with respect to the cost of access, which allows system 400 to answer a query with a particular "bias" (e.g., the bias of a particular expert or team of experts) in a certain amount of time (e.g., a delay of 10 seconds).

Historical questions asked of "X" circuit 416 forms a historical questions network from accumulated additional questions, referred to herein as "historical" questions that have been posed to a specific predetermined responding entity "X" through the disclosed emulation Q&A system 400 over some time period. The historical questions network is different than the Q&A question topics that were presented to the emulation Q&A system 400 during development, although aspects of the topics and networks may overlap. The historical questions network reflects a number of features that may be used by emulation analyzer circuit 412 and confidence levels circuit 406 to condition the responses provided by emulation Q&A system 400. For example, the historical questions network may reflect a concentration of questions in some regions (e.g., finance), and reflect a sparseness of questions in other regions (e.g., urban lifestyles). The new set of questions represented by the historical questions matrix then creates a distortion matrix, representing a transformation from the Q&A question topics to that of the specific predetermined responding entity's question topics. This distortion matrix may then be used to modify a confidence level that confidence levels circuit 406 of analyzer circuit 412 applies when determining an answer to a question. More specifically, when the distortion matrix is dense (indicating entity "X" is more of an expert than the emulation Q&A system) the required TH for confidence is adjusted (typically raised) for analyzer circuit 412 as it approaches an answer in this region. When the distortion matrix is sparse (indicating entity "X" is less of an expert than emulation NLP Q&A system 400) the required TH for confidence is adjusted (typically lowered) for analyzer circuit 412 as it approaches an answer in this region (and therefore, when TH is lowered, it will often be wrong).

Additionally, the distortion matrix can be incorporated as an additional consideration taken into account by the previously described functionality of corpus and personality traits of "X" circuit 414 that estimates the value of accessing a particular database with respect to the cost of access, which allows system 400 to answer a query with a particular "bias" (e.g., the bias of a particular expert or team of experts) in a certain amount of time (e.g., a delay of 10 seconds). For example, if the information to be accessed corresponds to a dense region of the distortion matrix, the value of accessing the information may be increased. If the information to be accessed corresponds to a sparse region of the distortion matrix, the value of accessing the information may be decreased.

Similarly, historical answers provided by "X" circuit 418 forms a historical answers network from accumulated answers, referred to herein as "historical" answers that have been provided by a specific predetermined responding entity "X" through the disclosed emulation Q&A system 400 over some time period. The historical answers network reflects a number of features that may be used by analyzer circuit 412 and confidence levels circuit 406 to condition the responses provided by emulation Q&A system 400. For example, the historical answers network may reflect a concentration of answers in some regions (e.g., finance), and reflect a sparseness of answers in other regions (e.g., urban lifestyles). The answers represented by the historical answers matrix may be used to create a distortion matrix (which may be the same distortion matrix generated by the historical questions matrix described above), which may be used to modify a confidence level that confidence levels circuit 406 of analyzer circuit 412 applies when determining an answer to a question. More specifically, when the distortion matrix is dense (indicating entity "X" is more of an expert than the emulation Q&A system) the required TH for confidence is changed (typically higher) for analyzer circuit 412 as it approaches an answer in this region. When the distortion matrix is sparse (indicating entity "X" is less of an expert than emulation NLP Q&A system 400) the required TH for confidence is changed (typically lowered) for analyzer circuit 412 as it approaches an answer in this region (and therefore, when TH is lowered, it will often be wrong).

Additionally, this distortion matrix, similar to the distortion matrix generated by the historical questions matrix described above, can be incorporated as an additional consideration taken into account by the previously described functionality of corpus and personality traits of "X" circuit 414 that estimates the value of accessing a particular database with respect to the cost of access, which allows system 400 to answer a query with a particular "bias" (e.g., the bias of a particular expert or team of experts) in a certain amount of time (e.g., a delay of 10 seconds). For example, if the information to be accessed corresponds to a dense region of the distortion matrix, the value of accessing the information may be increased. If the information to be accessed corresponds to a sparse region of the distortion matrix, the value of accessing the information may be decreased.

As previously noted herein, electronic tool 408 may include all of the functionality of node 10 (shown in FIGS. 1 and 2) of cloud 50. Electronic tool 408 may further include functionality that allows it to receive or gather communications (e.g., questions) made by user/client 420 through user interface 410 and GUI/UX 432. For instance, electronic tool 408 may include a mobile device such as a smartphone, a smartwatch, a tablet computer, a laptop computer, etcetera, as well as stationary devices such as a desktop computer, a mainframe and the like. User interface 404 may include one or more microphones to receive audio communications made by user/client 420, along with one or more means of receiving textual communications from user/client 420, such as a virtual or physical keyboard or keypad. Electronic tool 408 may also convert any received audio communications into textual communications using one or more now known or later developed speech-to-text techniques. GUI/UX 432 provides a user experience (UX), which involves a person's behaviors, attitudes, and emotions about using a particular product, system or service. UX includes the practical, experiential, meaningful and valuable aspects of human-computer interaction and product ownership. Additionally, UX includes a person's perceptions of system aspects such as utility, ease of use and efficiency. The amount of information that a user is required to enter into a system in order to have that system perform a particular task impacts UX. User interface 410 and GUI/UX 432 include CAD, graphic, audio and video functionality that allow data of emulated "X" circuit 430 to be presented to user/client 420 in a variety of formats that reflect the style (e.g., voice, actual or CAD images, cadence, phraseology, quotes, etc.) of specific emulated entity "X."

User/client 420 may be a person who interfaces with electronic tool 408 to obtain advice from system 400 in a variety of areas including health, financial, social, family, and more. System 400 may be configured with more than one specific entity "X," and may provide user/client with options to choose from a menu of available specific entities "X" from which user/client 420 may receive emulated answers. For example, user/client 420 might select an emulation of a well known billionaire plus two of his team members to serve as a composite responding entity. System 400 may weight the two team members less in the composite. Additionally, system 400 may provide emulated answers from a selected entity and from a similar person judged to be relevant by system 400 using appropriate similarity metrics. The time of the emulation may be specified (e.g., what would a well known billionaire have said about this question 3 years ago?).

Figure 5:
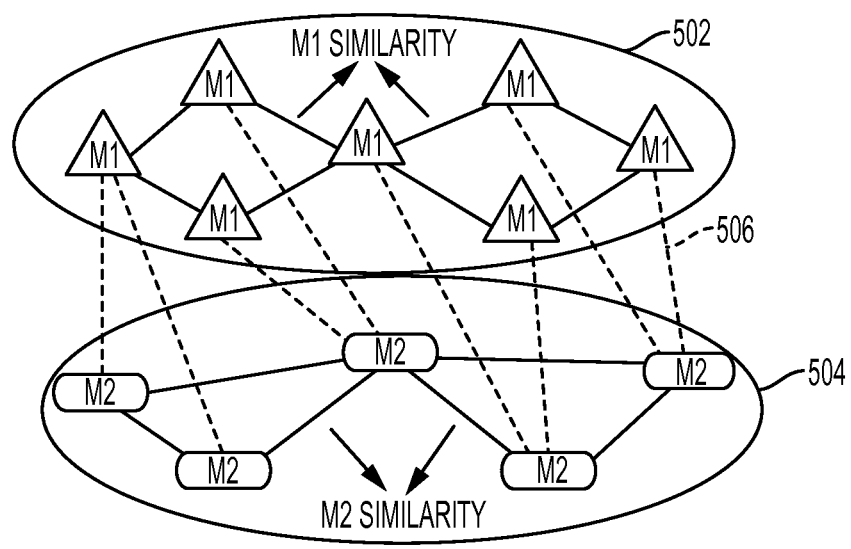
FIG. 5 depicts a graph illustrating an example of an inferential transfer learning function of the system shown in FIG. 4.

FIG. 5 depicts a heterogeneous graph illustrating additional details of how inferential transfer learning circuit 422 of FIG. 4 may be implemented. As previously noted herein, analyzer circuit 412 via inferential transfer learning circuit 422 uses machine learning to represent networks of data/information (e.g., corpus and personality traits of "X" circuit 414, historical questions asked of "X" circuitry 416, historical answers provided by "X" circuitry 418) as matrices and map the data/information matrices to one another. The mapping used in accordance with inferential transfer learning circuitry 422 utilizes three matrices, which are, broadly, one matrix of broader information/data, one matrix of more narrow information/data and one matrix for the relationship between the two networks. More specifically, as shown in FIG. 5, the mapping used in accordance with inferential transfer learning circuitry 422 includes a network and corresponding matrix 502 to represent topic similarity of questions asked (M1) to the emulation Q&A system over some time period, a network and corresponding matrix 504 to represent topic similarity of answers provided (M2) over the same time period, and a mapping matrix (dotted lines 506) that represents the specific answers to specific questions provided by the emulation Q &A system. More specifically, network and corresponding matrix 502 represent topic similarity of questions asked (M1) to the emulation Q&A system 400 over some time period, network and corresponding matrix 504 represents topic similarity of answers provided (M2) over the same time period, and mapping matrix (dotted lines 506) represents the specific answers to specific questions provided by the emulation Q &A system 400. There are three types of relationships encoded in the graph shown in FIG. 5. The edges shown in matrix 502 represent M1 similarities, the edges shown in matrix 504 represent M2 similarity and the dotted lines 506 represent M1-M2 relationships. A similar graph may be constructed that maps historical answers instead of historical questions.

Figure 6:
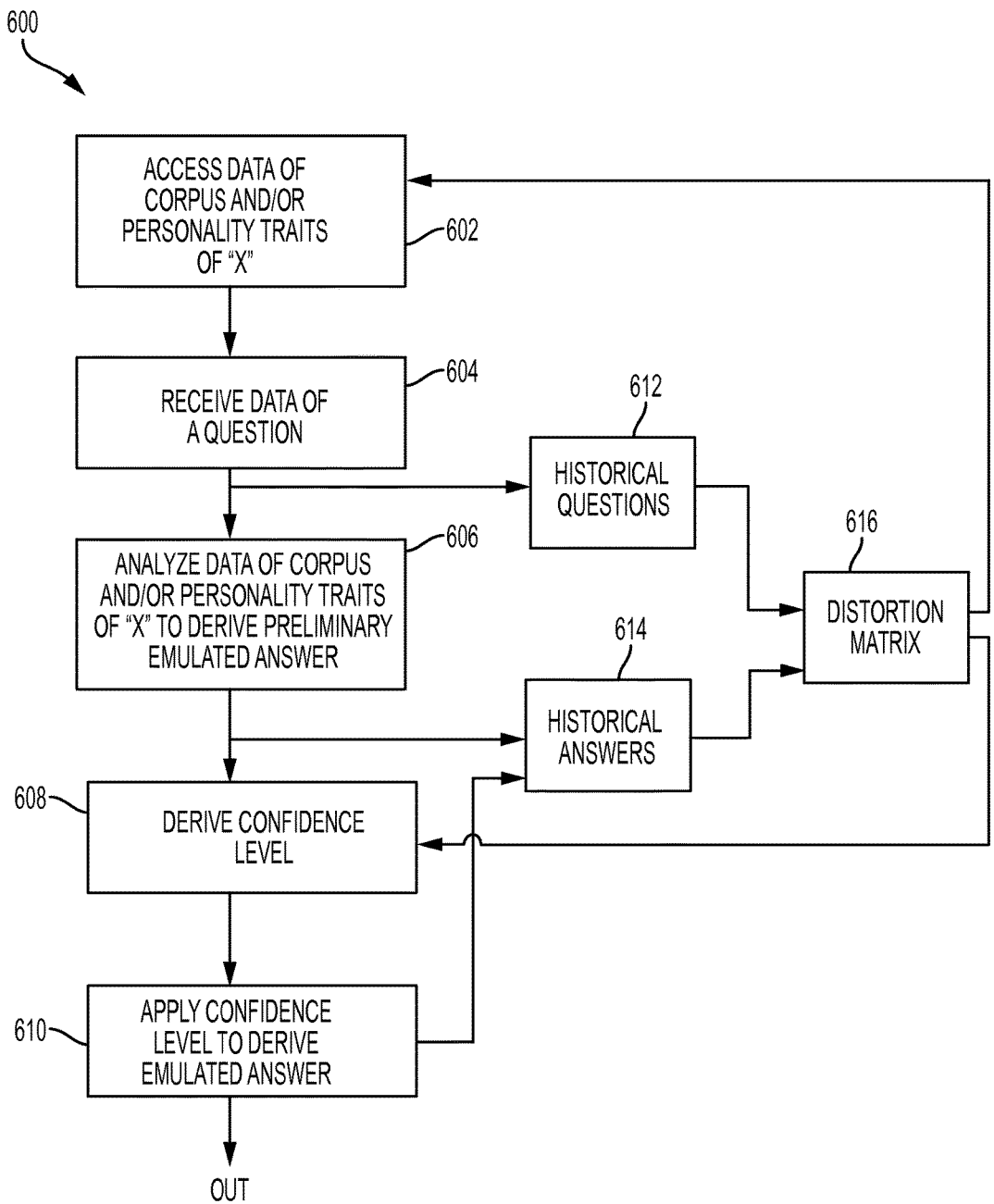
FIG. 6 depicts a flow diagram of a methodology according to one or more embodiments.

FIG. 6 depicts a flow diagram of a methodology 600 performed by system 400 (shown in FIG. 4) according to one or more embodiments. Although the operations of methodology 600 are illustrated in a particular order, it will be understood by persons of ordinary skill in the relevant art that the order of the illustrated operations may be changed without departing from the teachings of the present disclosure. In addition, it will be understood by persons of ordinary skill in the relevant art that one or more of the illustrated operations my omitted, and/or operations not shown may be incorporated, without departing from the teachings of the present disclosure. Methodology 600 begins at block 602 by accessing data of a corpus and/or data of personality traits of predetermined entity "X." Block 602 includes functionality that estimates the value of accessing a particular database with respect to the cost of access. Block 604 receives data of a question, and block 606 analyzes the data of blocks 602 and 604 to derive preliminary emulated answer to the question. Block 608 derives a confidence level of the preliminary emulated answer, and block 610 applies the confidence level to derive the emulated answer to the question.

Block 612 receives questions from block 604 to accumulate historical answers provided by predetermined entity "X." Similarly, block 614 receives preliminary emulated answers from block 606 and emulated answers from block 610 to accumulate historical answers provided by predetermined entity "X." Block 616 derives a distortion matrix based on either one or both of blocks 612 and 614. Block 616 is input to block 602, which takes the distortion matrix into account when estimating the value of accessing a particular database with respect to the cost of access. For example, if the information to be accessed corresponds to a dense region of the distortion matrix, the value of accessing the information may be increased. If the information to be accessed corresponds to a sparse region of the distortion matrix, the value of accessing the information may be decreased. Block 616 is also input to block 608, which takes the distortion matrix into account when deriving the confidence level of the preliminary emulated answer to the question. For example, when the distortion matrix is dense the required threshold (TH) for confidence is adjusted (typically raised) as methodology 600 approaches an answer in this region. When the distortion matrix is sparse the required TH for confidence is adjusted (typically lowered) as methodology 600 approaches an answer in this region. We also note that the relationship between the density of the distortion matrix and the required threshold may be nonmonotonic.

Additional configurations of and options for system 400 will now be described. Corpus and personality traits of "X" circuit 414 may draw upon and develop psychological profiles, experience and societal position in an electronic emulation of the responding entity "X" or cluster of responding entities. This permits GUI/UX 432 to communicate answers using realistic human-like video/CAD/audio that emulate both the substance and style of a specific entity "X." In order to carry this out, system 400 may optionally receive information in the form of a textual or voice input in a natural language. System 400 may parse the received input into pre-determined phrases based on a stored set of language rules for the natural language. System 400 may determine if the parsed phrases define aspects of an environment and, if so, create weighting factors to the natural language that are adaptive, wherein the created weighting factors are operable to create a weighted decision based upon the natural language. Also, system 400 may determine if the parsed phrases constitute a query and, if so, using the weighted factors to make a decision to the query.

System 400 may obtain a similarity measure between concepts based on Latent Semantic Analysis by taking onto account graph structure derived from the knowledge bases by using a vector propagation algorithm, in the context domain, such as a medical, financial, or social domain. Concepts contained in a corpus of documents may be expressed in a graph wherein each node is a concept and edges between nodes express relation between concepts weighted by the number of semantic relations determined from the corpus. A vector of neighbors may be created and assigned to each concept, thereby providing an improved similarity measure between documents, i.e., corpus and query against corpus.

System 400 may perform automatic detection of question and answer pairs contained in electronic communications channels. Communications channels for a given enterprise, for example, emails, text message strings, and discussion forum strings may be analyzed according to one or more features or patterns that are indicative of questions for detecting whether one or more questions are posed in a given communication. Answers that are relevant to identified questions are similarly identified by analyzing one or more communications for features and patterns that are indicative of answers to a question, and more particularly, to an identified question. Once an identified question is linked to an identified answer, the linked question and answer pair is stored in a publicly available repository for future reference by users having access to the repository.

In some applications of system 400, user/client 420 may seek answers from emulations of a network of people. For example, a social networking system may include a question and answer system that displays to a viewing user questions and answers provided by other users of the social networking system. The question and answer system may display answers to a particular question in a way that visually indicates both the global answer set and a subset of the global answer set, such as the viewing user's friends (or from emulations of great thinkers, politicians, philosophers, diplomats, scientists, etc.). The social networking system may also display to a viewing user news stories about another user asking or answering a question, wherein the format of the displayed new stories is based on an affinity that the viewing user has for the user who provided the question or answer mentioned in the news story. The displayed questions and/or answers may be associated with an object in the social networking system, where the user interface provides additional information about those objects. (see U.S. Pat. No. 8,589,807)

System 400 may also consider context. For example, entity "X" may have a different approach when answering questions at a convention than when responding to questions in one on one mentoring session. While the persona, attitude and message of entity "X" may be the same in both contexts, the answers provided may be slightly customize the different audiences. System 400 may capture this context of the event and audience, and may learn accordingly.

System 400 may make use of a learning phase and a test phase wherein the disclosed system's answers are compared to actual answers in order to demonstrate the disclosed system's accuracy.

Thus it can be seen from the forgoing detailed description that one or more embodiments of the present disclosure provide technical benefits and advantages. Specifically, one or more embodiments provide "emulation" NLP Q&A systems and methodologies that do not attempt to increase the overall volume of information that is accessed and processed by the system. Instead, the disclosed emulation Q&A systems and methodologies focus and refine the overall volume of information that is accessed and processes by the system in order to emulate the answers that the system determines, through analysis, would be provided by a predetermined responding entity or by a predetermined responding cluster of blended entity. The disclosed emulation NLP Q&A system emulates the substance of answers that would be provided by a predetermined responding entity or cluster of blended entities, and may also emulate the style (e.g., voice, actual or computer aided design (CAD) images, cadence, phraseology, quotes, etc.) of the responding entity, cluster of blended entities and various combinations of the preceding.

Figure 7:
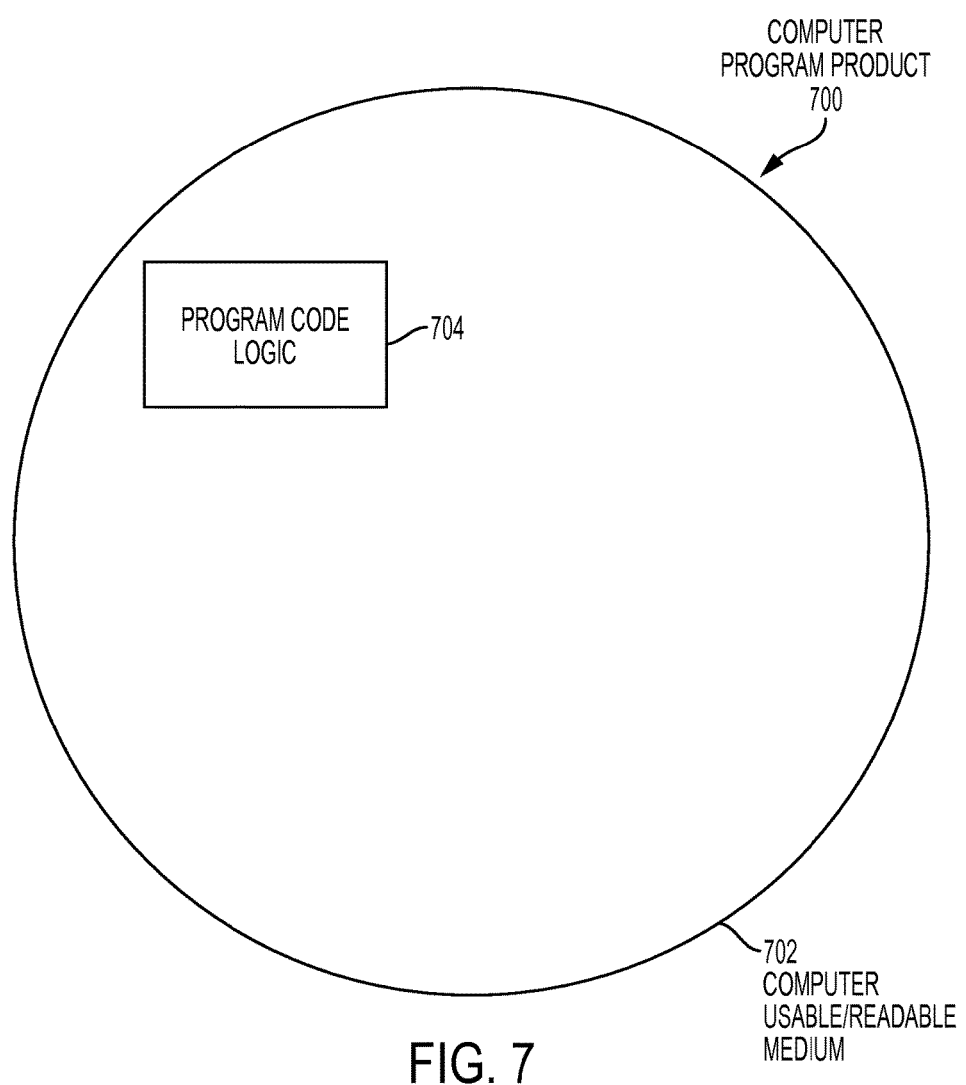
FIG. 7 depicts a diagram of a computer program product according to one or more embodiments.

Referring now to FIG. 7, a computer program product 700 in accordance with an embodiment that includes a computer readable storage medium 702 and program instructions 704 is generally shown.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An information processing system for generating data representing answers in response to data representing questions, the system comprising:
   a memory; and
   a processor system communicatively coupled to the memory;
   the processor system configure to:
   store in the memory data of a corpus of a plurality of predetermined entities;
   receive a question comprising a natural language format;
   receiving a selection of a predetermined entity from among the plurality of predetermined entities; and
   analyze data of the corpus of the predetermined entity to predict an emulated answer to the question;
   wherein the data of the corpus of the predetermined entity comprises:
   text-based corpus data of the predetermined entity;
   personality trait data of the predetermined entity;
   historical questions data representing historical questions asked of the predetermined entity; and
   historical answers data representing historical answers provided by the predetermined entity;
   wherein analyzing data of the corpus of the predetermined entity comprises performing, for the selected predetermined entity, an inferential transfer machine learning process comprising:
   using machine learning techniques to build a model of the predetermined entity; and
   using the model of the predetermined entity to predict the emulated answer to the question;
   wherein building the model comprises:
   representing the text-based data and the personality trait data in the text-based and personality trait matrix that is configured to identify through a first set of edges topic similarities among instances of the text-based data and the personality trait data;
   representing the historical questions data in a historical questions matrix that is configured to identify through a second set of edges topic similarities among instances of the historical questions data;
   representing the historical answers data in a historical answers matrix that is configured to identify through a third set of edges topic similarities among instance of the historical answers data; and
   mapping the text-based and personality trait, historical questions, and historical answers matrices to each other to generate a relationship matrix that is configured to identify relationships among the instances of the text-based and the personality trait data, the instances of the historical questions data, and the instances of the historical answers data, wherein the model of the predetermined entity comprises the relationship matrix;
   wherein the emulated answer comprises a substance component and a style component;
   wherein the style component comprises an emulation of a style, estimated to be possessed by the predetermined entity, of answering questions;
   wherein the substance component comprises an emulation of the substance of an actual answer that would be provided by the predetermined entity.

2. The system of claim 1, wherein the emulated answer comprises a natural language format.

3. The system of claim 1, wherein the processor system is further configured to determine a value of accessing at least a portion of the data of the corpus in comparison to a cost of accessing the at least a portion of the data of the corpus.

4. The system of claim 1, wherein the processor system is further configured to generate a distortion matrix based at least in part on the historical questions matrix.

5. The system of claim 2, wherein the processor system comprises a node of a cloud computing system.

6. The system of claim 4, wherein the processor system is further configured to make an adjustment to the emulated answer based at least in part on the distortion matrix.

7. The system of claim 6, wherein the processor system is further configured to generate the distortion matrix based at least in part on the historical answers matrix.

8. The system of claim 4, wherein the processor system is further configured to:
determine a value of accessing at least a portion of the data of the corpus in comparison to a cost of accessing the at least a portion of the data of the corpus; and
make an adjustment, based at least in part on the distortion matrix, to the value of accessing the at least a portion of the data of the corpus in comparison to the cost of accessing the at least a portion of the data of the corpus.

9. The system of claim 8, wherein the processor system is further configured to generate the distortion matrix based at least in part on the historical answers matrix.

10. An information processing system for generating data representing answers in response to data representing questions, the system comprising:
a memory; and
a processor system communicatively coupled to the memory;
the processor system configured to perform a method comprising:
storing in the memory data of a corpus of a plurality of predetermined entities;
receiving a question comprising a natural language format;
receiving a selection of a predetermined entity from among the plurality of predetermined entities; and
analyzing data of the corpus of the predetermined entity to predict an emulated answer to the question;
wherein the data of the corpus of the predetermined entity comprises:
text-based corpus data of the predetermined entity;
personality trait data of the predetermined entity;
historical questions data representing historical questions asked of the predetermined entity; and
historical answers data representing historical answers provided by the predetermined entity;
wherein analyzing data of the corpus of the predetermined entity comprises performing, for the selected predetermined entity, an inferential transfer machine learning process comprising:
using machine learning techniques to build a model of the predetermined entity; and
using the model of the predetermined entity to predict the emulated answer to the question;
wherein building the model comprises:
representing the text-based data and the personality trait data in the text-based and personality trait matrix that is configured to identify through a first set of edges topic similarities among instances of the text-based data and the personality trait data;
representing the historical questions data in a historical questions matrix that is configured to identify through a second set of edges topic similarities among instances of the historical questions data;
representing the historical answers data in a historical answers matrix that is configured to identify through a third set of edges topic similarities among instance of the historical answers data; and
mapping the text-based and personality trait, historical questions, and historical answers matrices to each other to generate a relationship matrix that is configured to identify relationships among the instances of the text-based and the personality trait data, the instances of the historical questions data, and the instances of the historical answers data, wherein the model of the predetermined entity comprises the relationship matrix;
wherein the emulated answer comprises a substance component and a style component;
wherein the style component comprises an emulation of a style, estimated to be possessed by the predetermined entity, of answering questions;
wherein the substance component comprises an emulation of the substance of an actual answer that would be provided by the predetermined entity.

11. The system of claim 10, wherein the emulated answer comprises a natural language format.

12. The system of claim 10, wherein the method performed by the processor system further comprises determining a value of accessing at least a portion of the data of the corpus in comparison to a cost of accessing the at least a portion of the data of the corpus.

13. The system of claim 10, wherein the method performed by the processor system further comprises generating a distortion matrix based at least in part on the historical questions matrix.

14. The system of claim 13, wherein the method performed by the processor system further comprises making an adjustment to the emulated answer based at least in part on the distortion matrix.

15. The system of claim 14, wherein the method performed by the processor system further comprises generating the distortion matrix based at least in part on the historical answers matrix.

16. The system of claim 13, wherein the method performed by the processor system further comprises:
determining a value of accessing at least a portion of the data of the corpus in comparison to a cost of accessing the at least a portion of the data of the corpus; and
making an adjustment, based at least in part on the distortion matrix, to the value of accessing the at least a portion of the data of the corpus in comparison to the cost of accessing the at least a portion of the data of the corpus.

17. The system of claim 16, wherein the method performed by the processor system further comprises generating the distortion matrix based at least in part on the historical answers matrix.

18. A computer program product for generating data representing answers in response to data representing questions, the computer program product comprising:
a computer readable storage medium having program instructions embodied therewith, wherein the computer readable storage medium is not a transitory signal per se, the program instructions readable by a processor circuit to cause the processor circuit to perform a method comprising:
storing, using a memory of the processor circuit, data of a corpus of a plurality of predetermined entities;
receiving a question comprising a natural language format; and
analyzing data of the corpus of the predetermined entity to derive an emulated answer to the question;
wherein the data of the corpus of the predetermined entity comprises:
text-based corpus data of the predetermined entity;
personality trait data of the predetermined entity;
historical questions data representing historical questions asked of the predetermined entity; and historical answers data representing historical answers provided by the predetermined entity;

wherein analyzing data of the corpus of the predetermined entity comprises performing, for the selected predetermined entity, an inferential transfer machine learning process comprising:

using machine learning techniques to build a model of the predetermined entity; and using the model of the predetermined entity to predict the emulated answer to the question;

wherein building the model comprises:

representing the text-based data and the personality trait data in the text-based and personality trait matrix that is configured to identify through a first set of edges topic similarities among instances of the text-based data and the personality trait data;

representing the historical questions data in a historical questions matrix that is configured to identify through a second set of edges topic similarities among instances of the historical questions data;

representing the historical answers data in a historical answers matrix that is configured to identify through a third set of edges topic similarities among instance of the historical answers data; and mapping the text-based and personality trait, historical questions, and historical answers matrices to each other to generate a relationship matrix that is configured to identify relationships among the instances of the text-based and the personality trait data, the instances of the historical questions data, and the instances of the historical answers data, wherein the model of the predetermined entity comprises the relationship matrix;

wherein the emulated answer comprises a substance component and a style component;

wherein the style component comprises an emulation of a style, estimated to be possessed by the predetermined entity, of answering questions;

wherein the substance component comprises an emulation of the substance of an actual answer that would be provided by the predetermined entity;

wherein the emulated answer comprises a natural language format.

19. The computer program product of claim 18, wherein the method performed by the processor circuit further comprises:

generating a distortion matrix based at least in part on the historical questions matrix; and making an adjustment to the emulated answer based at least in part on the distortion matrix.

20. The computer program product of claim 19, wherein the method performed by the processor circuit further comprises:

determining a value of accessing at least a portion of the data of the corpus in comparison to a cost of accessing the at least a portion of the data of the corpus; and making an adjustment, based at least in part on the distortion matrix, to the value of accessing the at least a portion of the data of the corpus in comparison to the cost of accessing the at least a portion of the data of the corpus.

\* \* \* \* \*